US011930585B2

(12) United States Patent
Bai et al.

(10) Patent No.: US 11,930,585 B2
(45) Date of Patent: Mar. 12, 2024

(54) MATERIAL SYNTHESIS TECHNOLOGY BY MICROWAVE PLASMA TORCH WITH ATMOSPHERIC PRESSURE AND HIGH TEMPERATURE

(71) Applicants: Ye Bai, Chengdu (CN); Dashuai Li, Chengdu (CN)

(72) Inventors: Ye Bai, Chengdu (CN); Dashuai Li, Chengdu (CN)

(73) Assignee: Chengdu Landmarks Technology Co., Ltd, Chengdu (CN)

( * ) Notice: Subject to any disclaimer, the term of this patent is extended or adjusted under 35 U.S.C. 154(b) by 317 days.

(21) Appl. No.: 17/355,259

(22) Filed: Jun. 23, 2021

(65) Prior Publication Data

US 2022/0007488 A1 Jan. 6, 2022

(51) Int. Cl.
*H05H 1/30* (2006.01)
*H05H 1/03* (2006.01)

(52) U.S. Cl.
CPC ................ *H05H 1/30* (2013.01); *H05H 1/03* (2013.01)

(58) Field of Classification Search
CPC .. H05H 1/30; H05H 1/03; H05H 1/28; H05H 1/34; C23C 16/517
USPC .......................................................... 219/686
See application file for complete search history.

(56) References Cited

U.S. PATENT DOCUMENTS 3,533,777 A * 10/1970 Mctaggart ................. C22B 4/00 75/10.28
3,877,960 A * 4/1975 Knoss ................... C23C 14/223 427/217
5,174,962 A * 12/1992 Brennan ................ C07H 21/00 250/281
5,648,701 A * 7/1997 Hooke .................. H01J 37/321 315/111.41
5,811,055 A * 9/1998 Geiger ................... B23K 9/325 266/49
5,847,355 A * 12/1998 Barmatz ................ B23K 10/02 219/121.38
6,696,662 B2 * 2/2004 Jewett ............... H01J 37/32009 219/121.48
6,821,379 B2 * 11/2004 Datta ................ H01J 37/32376 156/345.43
6,888,040 B1 * 5/2005 Shufflebotham .... C23C 16/4412 95/131
7,601,324 B1 * 10/2009 Al-Quraishi ........... C01G 29/00 422/186.04

(Continued)

*Primary Examiner* — Eric S Stapleton

(57) ABSTRACT

An apparatus for a material synthesis technology by microwave plasma torch with atmospheric pressure and high temperature. The apparatus includes a plasma torch system and a material growth system. In the plasma torch system, the cutting-edge breakdown happens through inputting the high-power microwave. Then the stable plasma torch with atmosphere pressure and high temperature is achieved in precursor at the open-end of the cylindrical metal tube. The precursors are decomposed by the plasma torch with high temperature and the active particles for material growth are achieved. In the material growth system, the motion and ingredients proportion of negative and positive icons or particles in the active particle beam are controlled by the adjustable static electric field in the space between the plasma torch and material growth space. The material-controlled growth is implemented by the heating system and the adjustable static electrical field.

1 Claim, 3 Drawing Sheets

(56) References Cited

U.S. PATENT DOCUMENTS 7,833,505 B2 * 11/2010 Donnet ................. C01B 32/162 977/843
7,846,414 B2 * 12/2010 Harbec ................... C01B 32/18 204/173
9,125,647 B2 * 9/2015 Goraltchouk ............. D02J 3/10
9,409,141 B2 * 8/2016 Sunkara ................... C01G 1/02
10,304,665 B2 * 5/2019 Gorokhovsky ... H01J 37/32715
10,676,353 B2 * 6/2020 Soane .................... B01J 19/081
10,858,296 B1 * 12/2020 Myrick ................... C06B 45/04
10,974,963 B2 * 4/2021 Kageyama .............. G03F 7/105
2002/0040889 A1 * 4/2002 Markunas ................ H05H 1/46 219/121.36
2003/0211030 A1 * 11/2003 Olivier .................... D01F 9/127 423/447.3
2004/0118348 A1 * 6/2004 Mills ........................ G21K 1/00 118/723 MW
2005/0093458 A1 * 5/2005 Babayan ................. H01L 23/08 257/E23.137
2007/0007257 A1 * 1/2007 Uhm ........................ H05H 1/30 219/121.48
2008/0296294 A1 * 12/2008 Uhm ...................... B01J 19/088 219/688
2009/0121638 A1 * 5/2009 Price ........................ H05H 1/46 315/111.21
2009/0123360 A1 * 5/2009 Mills ......................... C01B 7/00 423/393
2009/0129992 A1 * 5/2009 Mills ...................... B01J 19/087 422/198
2009/0142257 A1 * 6/2009 Mills ......................... C01B 3/00 423/645
2009/0148731 A1 * 6/2009 Mills ................. H01M 8/04216 429/421
2014/0263181 A1 * 9/2014 Park .................. H01J 37/32146 216/68
2014/0265044 A1 * 9/2014 Foret ........................ H05H 1/48 425/72.1
2017/0221688 A1 * 8/2017 Nagata .................. H01J 49/105
2018/0130638 A1 * 5/2018 Ahmad ............... B29C 65/1483
2021/0115531 A1 * 4/2021 Wang ...................... C22B 9/225

* cited by examiner

MATERIAL SYNTHESIS TECHNOLOGY BY MICROWAVE PLASMA TORCH WITH ATMOSPHERIC PRESSURE AND HIGH TEMPERATURE

BACKGROUND

The present invention relates to the area of material synthesis technology. More particularly, it relates to a method for synthesizing new materials by microwave plasma torch with atmospheric pressure and high temperature.

Due to the quick development of information technology and the great demand of industry for new material, synthesizing high-performance and superior quality materials is a research focus in the front of science and technology. The new structure materials, such as zero, one and two degree nanometer materials, are expected due to their high-performance in machinery, thermal behavior and electricity. They are the important basement of the next generation of information, energy and aerospace. There are not only amazing applications in large scale integrated circuits and new sensors but also solar energy and storage battery.

Now the chemical methods are the mains for synthesizing new materials. For example, CVD (Chemical Vapor Deposition) is one of them based on the chemical activation and vapor deposition technology. High temperature and vacuum sputter deposition, direct-current vacuum plasma technologies are other ones. Although there are lots of successes in the methods but still some problems in synthesizing new materials, such as extreme difficulty for splitting decomposition and activation for material due to the high bond energy among the molecules or atoms by the above technologies.

SUMMARY

A technology for synthesizing new materials is provided in the present invention. More specifically, the present invention provides methods for synthesizing material based on the microwave plasma torch with atmosphere pressure & high temperature. It can overcome difficulties in activation of precursor and material growth control by the method of chemical vapor deposition, high temperature and vacuum sputter deposition. New materials can be synthesized quickly from different states and types of precursor material.

For the invention purpose, the present invention—the synthesizing material system based on atmosphere pressure & high temperature comprises the plasma torch system with atmosphere pressure & high temperature and the material growth system.

The plasma torch system with atmosphere pressure & high temperature is constituted by a high power microwave source and coupling transmitting structure and plasma torch generator.

The plasma torch generator includes a length of coaxial central hollow conductor and an igniter electrode. Precursor carrier gases go through the coaxial central hollow conductor. The igniter electrode is a length of the metal bar on the output-end of the coaxial central conductor and can move along the axial of the system, shown in FIG. 2.

High power microwave was input from the microwave source to the output-end of the plasma torch generator by the coupling and transmitting structure which is coaxial transmission line form. At system start-up the igniter electrode of the plasma torch generator is closed to the output-end of the coaxial central hollow conductor. The cutting-edge breakdown happens between the end of the coaxial central hollow conductor and the igniter electrode when high power microwave input to there. Then the igniter electrode moves away and places in the space where materials grow. The precursor carrier gases from the output-end of the coaxial central hollow conductor come into being stable plasma torch by the discharge of point shape and avalanche effect under the action of high power microwave.

The material growth system includes a length of quartz glass tube with two flanges, a metal ring, an adjustable direct current (DC) source and the igniter electrode. The output-end of the plasma torch generator and the igniter electrode are sealed in the material growth system. The metal ring is on outside wall of the quartz glass tube, and the adjustable DC source connects to the metal ring and the igniter electrode. The electric field in the growth space comes into being due to the DC source with the metal ring and the igniter electrode. The activating particles beam from the precursor decomposed and activating by the plasma torch moves forward in the electric field. The motion of negative & positive ions, electrons and particles in the activating particles beam would change under the effect of the electric field.

For the invention purpose, the present invention provides a synthesizing material system of atmosphere pressure & high temperature. In the plasma torch generator the cutting-edge breakdown happens due to the igniter electrode close to the output-end of the coaxial central hollow conductor when high power microwave arrives there. Due to cutting-edge breakdown and high power microwave the precursor carrier gases from the output-end of the coaxial central hollow conductor decomposes into the activating particles beam and the stable plasma torch with atmosphere pressure & high temperature comes being by the avalanche effect. It overcomes difficulties in splitting decomposition and activation of precursor. The distribution of electric field in the growth space between the metal ring and the igniter electrode connected with the DC source affects the activating particles beam. The growth space is heated for the material growth. So the controllable growth of the material is implemented.

BRIEF DESCRIPTION OF THE DRAWINGS

For a more complete understanding of the present invention and for further details and advantages thereof, reference is now made to the following drawings and descriptions thereof.

DETAILED DESCRIPTION OF SPECIFIC EMBODIMENTS

In the following, a specific embodiment of the present invention will be described in detail with reference to the accompanying drawings such that those skilled in the art can better understand the invention. It is noted that well-known functions and configurations are not described in detailed to avoid obscuring the present invention.

Figure 1:
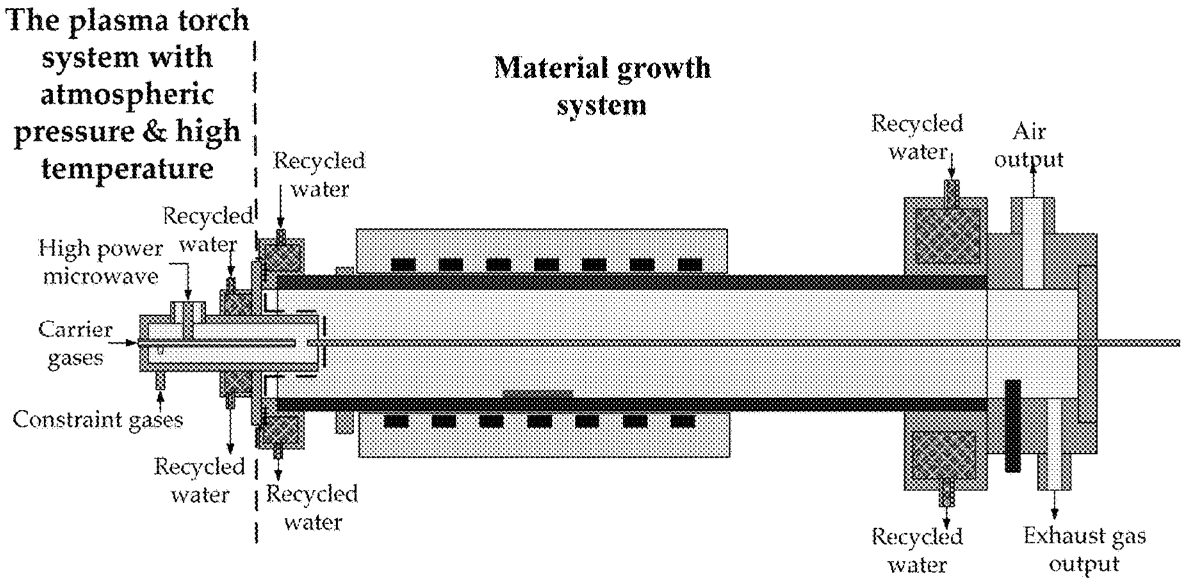
FIG. 1 shows a diagram of specific implementation modality of the material synthesis technology by microwave plasma torch with atmospheric pressure and high temperature as in the present invention.

FIG. 1 is a diagram of specific implementation modality of the material synthesis technology by microwave plasma torch with atmospheric pressure & high temperature as in the present invention.

In the embodiment, the invention—the synthesizing material technology based on atmosphere pressure & high temperature comprises the plasma torch system with atmosphere pressure & high temperature and material growth control system shown in FIG. 1.

The precursor decomposes to the activating particles for material growth in the plasma torch with atmosphere pressure & high temperature. The activating particles carried by the airflow move into the growth space. The material is synthesized from the activating particles under control of the growth control system.

1. The Plasma Torch System with Atmosphere Pressure & High Temperature

The plasma torch system with atmosphere pressure & high temperature generates the plasma torch by inputting high microwave. The plasma with thousands of degrees centigrade and high frequency electromagnetic oscillation makes the precursor material with all kinds of form decomposition into the activating particles constituted by atom, ion, electron and molecule or molecule group. That is the particle source for synthesizing materials.

Figure 2:
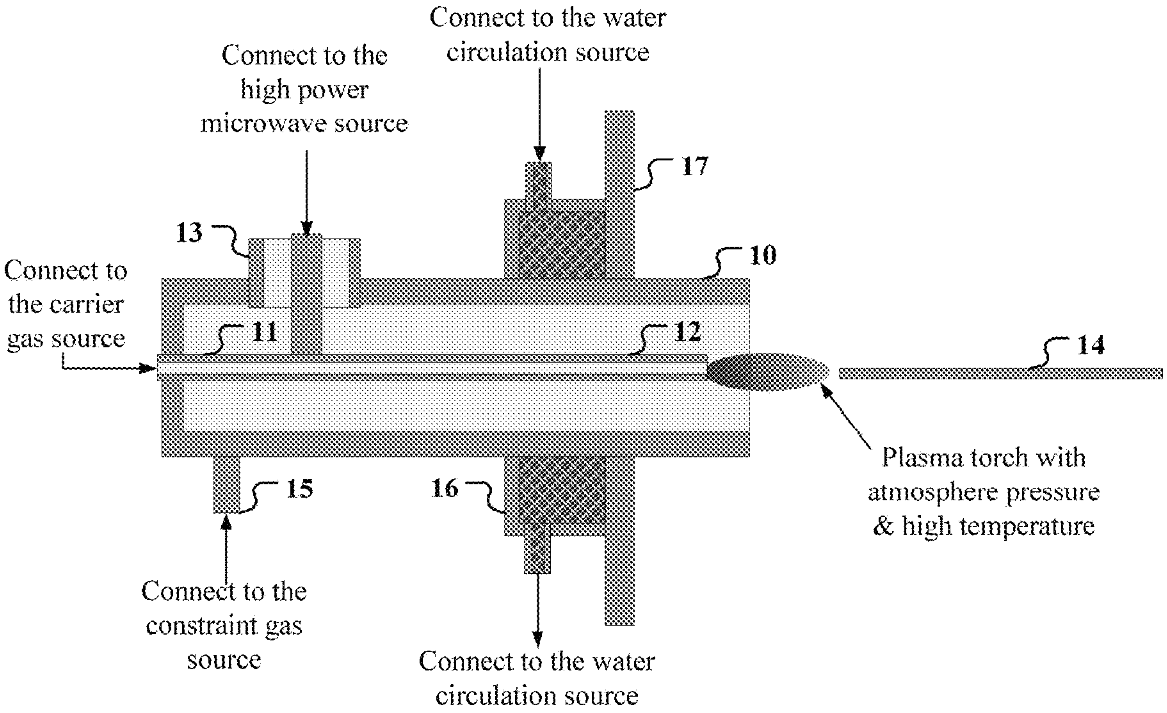
FIG. 2 shows a structure diagram of the microwave plasma torch system with atmospheric pressure and high temperature.

In the embodiment, the plasma torch system with atmosphere pressure & high temperature comprises the high power microwave source and coupling transmission system, the plasma torch generator, the torch constrain and protective gas film formation, and the rejection of heat by recycled water shown in FIG. 2.

1) The High Power Microwave Source and Coupling Transmission System

In the embodiment, the high power microwave from the source by the coupling transmission system inputs to the plasma torch generator, shown in FIG. 2. The frequency of the high power microwave source is 2.45 GHz or 0.915 GHz. The output power of the source is from a few watts to tens kilowatts, and adjustable. The coupling transmission system is cylindrical coaxial metal tubes with an open-end and a closed-end, being composed of coaxial outer conductor 10, coaxial inner conductor 11 and connector 13. The coaxial inner conductor 11 is a length of a cylindrical metal tube whose one end connects the carrier gas source and another connects the input port of the cylindrical metal tube 12 of the plasma torch generator. The output port of the high power microwave source connects the coupling transmission system by the connector 13 what is at the side wall of the coaxial outer conductor 10. The inner conductor of connector 13 extends to the coaxial inner conductor 11 and keeps the electrical conduction with it. The outer conductor of connector 13 connects with the coaxial outer conductor 10 and keeps the electrical conduction with it. The high microwave between the coaxial outer conductor 10 and the coaxial inner conductor 11 transmits to the open-end of the system along the axis of the cylindrical coaxial metal tube. In the embodiment, the type of connector 13 is L16 or L29 coaxial connector.

2) The Plasma Torch Generator

In the embodiment, the plasma torch generator is composed of a length of cylindrical metal tube 12 and an igniting & control electrode 14 as in FIG. 2. The cylindrical metal tube 12 is the input channel of the precursor carrier gas or the installation site of a solid precursor. In the embodiment, the igniting & control electrode is along the extended line of the cylindrical metal tube, close to the output-end of the cylindrical metal tube 12 and moveable. The transmission line is constituted by the coaxial outer conductor 10 and the cylindrical metal tube 12 what is shorter than the coaxial outer conductor 10 as the cut-off waveguide for preventing the microwave leak. At the system start-up the igniting & control electrode 14 is closed to the cylindrical metal tube 12 and the cutting-edge breakdown happens due to inputting high power microwave. Then the igniting & control electrode 14 moves away and places in the material growth space. The precursor carrier gas from the cylindrical metal tube 12 is decomposed of the cutting-edge breakdown due to the high power microwave and the stable plasma torch with atmosphere pressure & high temperature generates under the avalanche effect of the cutting-edge breakdown.

3) The Water Circulation Structure for Temperature Isolation and the Plasma Torch Constraint Structure.

In the embodiment, the plasma torch system with atmosphere pressure & high temperature also includes the water circulation structure for temperature isolation and the plasma torch constraint structure.

The plasma torch constraint structure is as: The gas input hole 15 is drilled the sidewall of the coaxial outer conductor 10 and connects to the gas source by pipelines. A certain velocity of gas through the hole 15 from the gas source inputs under the control of the flow controller. Then the gas flow between the coaxial inner conductor 11, 12 and the coaxial outer conductor 10 moves to the open-end of the cylindrical coaxial metal tube. At the same time the gas film forms on the inside-wall of the coaxial outer conductor 10. The gas film can avoid the air breakdown between the plasma torch and the coaxial outer conductor 10, and protects the coaxial outer conductor 10 from ablation. Meanwhile the gas flow constrains the plasma torch within a space and then a stable plasma torch generates. In the embodiment, the input gas is hydrogen gas.

The water circulation structure for temperature isolation is as: A coaxial cylindrical metal cavity 16 connects to the cylindrical coaxial metal tube as shown in FIG. 2. The inner diameter of the cavity 16 is the same as the external diameter of the coaxial outer conductor 10. The cavity 16 is also the plate 17 for sealing the material synthesis space. The cavity 16 can keep the heat away from the high power microwave source and coupling transmission system.

2. The Material Growth System

The material growth system should be sealed, can heat the material growth space and control the motion of the active particles. In the embodiment, material growth system is composed of the sealing structure, the heating system and the material growth control system, shown in FIG. 3.

1) The Sealing Structure

In the embodiment, the sealing structure includes a length of quartz tube 20, two flanges 21, 22 with water-cool jacket, two plates 17, 23. The space inside quartz tube 20 is for material growth. The flanges 21, 22 with plates 17, 23 are installed at the ends of the quartz tube 20 for sealing it. The open-ends of coaxial outer conductor 10 and the cylindrical metal tube 12 are in the sealing space. A hole is drilled on the sidewall of the flange 22 for the gas outlet, connecting the gas collector. A hole is drilled at the center of the plate 23 for the igniting & control electrode 14 inserting the quartz tube 20. The plate 17 is also a sidewall of the cavity 16. The flanges with water-cool jackets isolate the heat from the material growth space.

2) The Heating System

Figure 3:
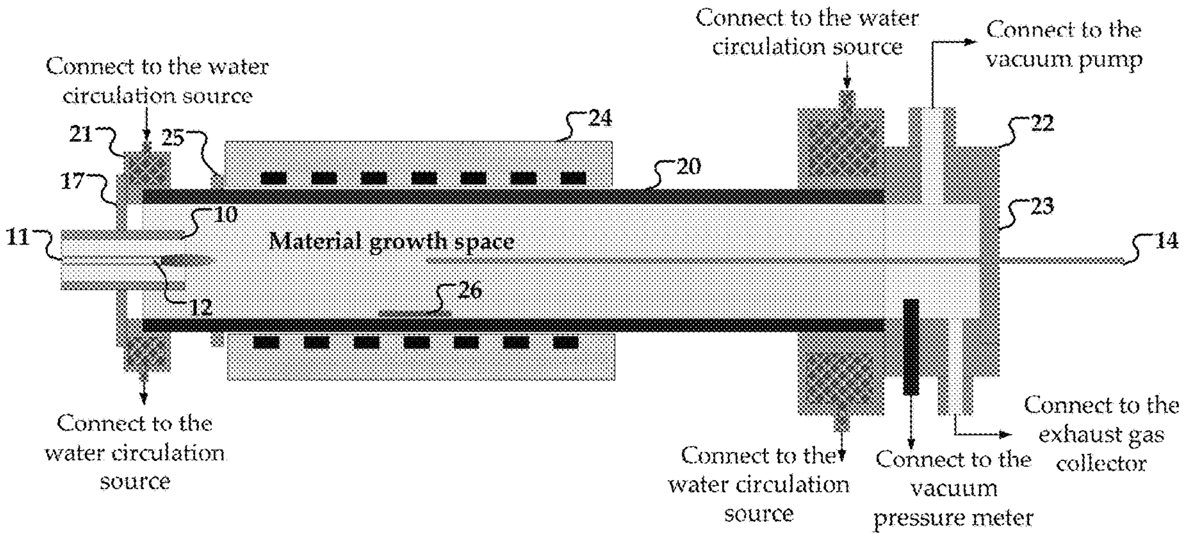
FIG. 3 shows a structure diagram of the material growth and control system.

In the embodiment, a cylindrical heating system 24 is placed outside of the quartz tube 20 for heating the material growth space, shown in FIG. 3. It offers the temperature distribution in the material growth space according to the material growth requirement. The heating around the quartz tube 20 is uniform, and there is a temperature grade along the axial of the quartz tube 20. The temperature inside the quartz tube 20 is from 100° C. to 1500° C. The cylindrical heating system 24 can move along the axial of the quartz tube 20.

3) The Material Growth Control System

In the embodiment, the material growth control system is composed of a metal ring 25, the igniting & control electrode 14 and an adjustable DC source. The metal ring 25 places at the outside wall of the quartz tube 20, close to the flange 21. The metal ring 25 and the igniting & control electrode 14 connect to the adjustable DC source. A static electric field in the material growth space comes into being under the control of the adjustable DC source. The motion of the active particle beam change due to the static electric field, and the speed and ratio of the positive and negative ions, electrons and particles are controlled by the DC source.

In the embodiment, a substrate 26 places in the material growth space for particle deposition.

In the invention the plasma torch generates due to the high power microwave and the particles for material growth come into being. The highest temperature of the plasma is close to 5000° C., and almost all materials can decompose in the temperature and the electromagnetic oscillation with high frequency. It can supply any particles for material synthesis. At the same time the density, speed, temperature and ingredient of the active particle beam can be controlled by the electric field for satisfying the material growth.

General

Without any loss of generality, the present invention can be used in material synthesis, such as nanometer material synthesis. Additionally, practitioners can also use the present invention more generally in other area according to their need in new material synthesis.

Unless specifically stated otherwise, as apparent from the following discussions, it is appreciated that throughout the specification discussions utilizing terms such as “plasma”, “high power microwave”, “material synthesis”, “nanometer material”, “active particles beam” or the like, refer to the action and/or processes. In a similar manner, the term “material synthesis” may refer to “processing material” and may refer to any device. Unless specifically state otherwise, the terms “plasma” and “high power microwave” are used interchangeably. The methodologies described herein are, in one embodiment, can be performed by one or more system. In such embodiments, any system capable of executing this set of material synthesis that specifies actions to be taken may be included. Thus, one example is the nanomaterial synthesis. Note that when a method includes several elements, e.g., several steps, no ordering of such elements is implied, unless specifically stated.

Note that while some diagram(s) only show(s) a structure, those skilled in the art understand that several structures as described above are included, but not explicitly shown or described in order not to obscure the inventive aspect.

Note that, as would be known to one skilled in the art, if the number the units to be produced justifies the cost, any set of instructions in combination with elements. Thus, as will be appreciated by those skilled in the art, embodiments of the present invention may be embodied as a method, an apparatus such as a special purpose apparatus. Accordingly, aspects of the present invention may take the form of a method, an entirely hardware embodiment, an entirely software embodiment or an embodiment combining software and hardware aspects.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference, except in those jurisdictions where incorporation by reference is not permitted. In such jurisdictions, the Applicant reserves the right to insert portions of any such cited publications, patents, or patent applications if Applicant considers this advantageous in explaining and/or understanding the disclosure, without such insertion considered new matter.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a system comprising A and B should not be limited to systems consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Note that the claims attached to this description form part of the description, so are incorporated by reference into the description, each claim forming a different set of one or more embodiments.

What is claimed is:

1. A technology of material synthesis by microwave plasma torch, the technology comprising:

a plasma torch system with atmosphere pressure and high temperature and a material growth system;

the plasma torch system with atmosphere pressure and high temperature comprises a high-power microwave source and a coupling transmission system and a plasma torch generator;

the plasma torch generator comprising:

a length of cylindrical metal tube and an igniting and control electrode;

wherein, the technology is configured such that:

at the system start-up, an igniting and control electrode is close to an output-end of the cylindrical metal tube and a cutting-edge breakdown happens due to inputting high-power microwave;

the cutting-edge breakdown ignites the plasma torch at the output-end of the cylindrical metal tube generates under the effect of the high-power microwave; and the igniting and control electrode moves away and place in a material growth space;

the material growth system comprises a seal, a heater and a material growth control system;

the seal maintains a space with a length of a quartz tube, two flanges with a water-cool jacket and two plates;

the output-end of the cylindrical metal tube and the igniting and control electrode are placed inside the seal;

the heater heats the material growth space;

the material growth control system comprises a metal ring, an adjustable direct current (DC) source, an igniting and control electrode;

the metal ring is on the outside wall of the quartz tube, connected to the DC source with the electrode;

wherein, the technology is configured such that:

an adjustable static electrical field in the space between the plasma torch and material growth space affects an active particle beam; and the adjustable static electrical field controls the motion of the active particle, and the ingredients proportion of negative and positive ions or particles in the active particle beam; and a material growth can be controlled by the adjustable static electrical field.

* * * * *